(12) United States Patent
Nabemoto et al.

(10) Patent No.: US 7,649,659 B2  
(45) Date of Patent: Jan. 19, 2010

(54) IMAGE PROCESSING APPARATUS AND METHOD FOR USING MARK DETECTION TO COMBINE MULTIPLE IMAGES PRESENT ON THE FRONT AND REAR SURFACES OF A MEDIUM

(75) Inventors: Hideto Nabemoto, Uchinada-machi (JP); Yuichi Okumura, Uchinada-machi (JP)

(73) Assignee: PFU Limited, Ishikawa (JP)

( * ) Notice: Subject to any disclaimer, the term of this patent is extended or adjusted under 35 U.S.C. 154(b) by 119 days.

(21) Appl. No.: 10/587,983

(22) PCT Filed: Mar. 8, 2005

(86) PCT No.: PCT/JP2005/003941

§ 371 (c)(1),
(2), (4) Date: Aug. 3, 2006

(87) PCT Pub. No.: WO2005/088956

PCT Pub. Date: Sep. 22, 2005

(65) Prior Publication Data

US 2007/0127087 A1    Jun. 7, 2007

(30) Foreign Application Priority Data

Mar. 10, 2004   (JP) ............................. 2004-066549

(51) Int. Cl.
 *H04N 1/46* (2006.01)

(52) U.S. Cl. ...................... 358/538; 358/1.12; 358/1.18; 358/449; 358/450; 358/453; 358/474; 358/488; 358/505; 382/284; 382/317

(58) Field of Classification Search ................ 358/1.12, 358/1.18, 450, 505, 538, 449, 474, 488, 453; 382/317, 284

See application file for complete search history.

(56) References Cited

U.S. PATENT DOCUMENTS 5,140,647 A    8/1992   Ise et al.

(Continued)

FOREIGN PATENT DOCUMENTS

EP    0 598 408    5/1994

(Continued)

OTHER PUBLICATIONS

PCT International Preliminary Report on Patentability, dated Sep. 28, 2006, and issued in PCT International Application No. PCT/JP2005/003941.

(Continued)

*Primary Examiner*—Mark K Zimmerman  
*Assistant Examiner*—Javier J Ramos

(57) ABSTRACT

An image processing apparatus includes an image reading unit 3 that reads a front side image and a rear side image from a front side and a rear side of a medium, respectively, a mark detecting unit 42 that detects a combination instruction mark present in a predetermined position of at least one of the front side image and the rear side image, and an image combining unit 44 that combines, when the combination instruction mark is detected, a front side sliced image and a rear side sliced image sliced from predetermined positions of the front side image and the rear side image in a predetermined direction to obtain one image.

6 Claims, 14 Drawing Sheets

U.S. PATENT DOCUMENTS

| | | | |
|---|---|---|---|
| 5,452,105 A * | 9/1995 | Tamagaki et al. | 358/453 |
| 5,654,807 A | 8/1997 | Miyaza | |
| 5,689,755 A | 11/1997 | Ataka | |
| 5,708,513 A * | 1/1998 | Hasuo et al. | 358/450 |
| 6,263,118 B1 * | 7/2001 | Kanno et al. | 382/289 |
| 2003/0100354 A1 * | 5/2003 | Tomita et al. | 462/6 |
| 2003/0179412 A1 * | 9/2003 | Matsunoshita | 358/3.28 |

FOREIGN PATENT DOCUMENTS

| | | |
|---|---|---|
| EP | 0676889 | 10/1995 |
| JP | 1-229559 | 9/1989 |
| JP | 3-62050 | 3/1991 |
| JP | 5-328051 | 12/1993 |
| JP | 5-347701 | 12/1993 |
| JP | 7-283933 | 10/1995 |
| JP | 9-51401 | 2/1997 |
| JP | 9-107437 | 4/1997 |
| JP | 9-200507 | 7/1997 |
| JP | 09200507 A * | 7/1997 |
| JP | 11-32160 | 2/1999 |
| JP | 2000-50012 | 2/2000 |
| JP | 2001-341874 | 12/2001 |
| JP | 2002-7959 | 1/2002 |
| JP | 2002-281244 | 9/2002 |

OTHER PUBLICATIONS

International Search Report dated Jul. 12, 2005 in corresponding PCT Application No. PCT/JP2005/003941.

Extended European Search Report dated May 2, 2007 issued with respect to the corresponding European Patent Application No. 05720213.7.

Office Action issued in corresponding Japanese Patent Application No. 2004-066549, mailed on Sep. 11, 2007.

* cited by examiner

IMAGE PROCESSING APPARATUS AND METHOD FOR USING MARK DETECTION TO COMBINE MULTIPLE IMAGES PRESENT ON THE FRONT AND REAR SURFACES OF A MEDIUM

This application claims the benefit of PCT International Application No. PCT/JP2005/003941 filed Mar. 8, 2005 and Japanese Application No. 2004-066549, filed Mar. 10, 2004 in Japan, the disclosures of which are incorporated herein by reference.

TECHNICAL FIELD

The present invention generally relates to an image processing apparatus and method and a carrier sheet, and, particularly, to an image processing apparatus and method that accurately read an original of a size larger than a readable size of an original to obtain a combined image without processing for setting a reading mode and a carrier sheet used for the image processing apparatus and method.

BACKGROUND ART

In an image processing apparatus in which an image reading apparatus such as a scanner is connected to a personal computer, there has been proposed a method of reading an original of a size (for example, A3) larger than a readable size (for example, A4) of an original mainly considering a setting area for the scanner (see, for example, Patent Document 1). In this example, after folding one original into two to read images, the images are combined to obtain original one image.

Note that it is proposed to hold an original between a pair of transparent carrier sheets in order to surely and easily read an original having images printed on both sides (see, for example, Patent Document 2). In this example, the images on the front side and the rear side are not read substantially simultaneously. The original is reversed together with the carrier sheet to read the image on the rear side after the image on the front side is read.

Patent Document 1: Japanese Patent Laid-Open No. 7-283933

Patent Document 2: Japanese Patent Laid-Open No. 11-32160

DISCLOSURE OF THE INVENTION

Problems to be Solved by the Invention

According to the technique for folding an original into two to read images, in order to distinguish the image reading from a reading mode for a usual double-sided original (a mode for not combining images), a user has to perform operation for setting a mode for folding an original into two to read images. This causes a trouble for a user. Since it is necessary to perform mode switching in this way, it is impossible to mix a usual original (an original not folded into two) and an original folded into two and continuously read images. Since a carrier sheet is not used, an image on the front side and an image on the rear side read are misaligned because of twist of the original folded into two. Thus, when the images are combined, it is necessary to adjust heights (positions in a conveying direction) of the images. This causes troubles in image processing.

On the other hand, according to studies of the inventor, it has been found that, even if a usual carrier sheet is applied to the technique for folding the original into two to read images, it is impossible to read the images clearly. When a usual transparent carrier sheet is used, light for reading is reflected excessively on the surface of the carrier sheet to make it impossible to read images clearly. Additionally, since a roller slips on the surface on the carrier sheet and conveyance of the roller is not stable, it is impossible to read image clearly.

It is an object of the present invention to provide an image processing apparatus that accurately reads an original of a size larger than a readable size of an original using a carrier sheet without processing for setting a reading mode and obtains a combined image.

It is another object of the present invention to provide an image processing method for accurately reading an original of a size larger than a readable size of an original using a carrier sheet without processing for setting a special reading mode and obtaining a combined image.

It is still another object of the present invention to provide a carrier sheet that is used for accurately reading an original of a size larger than a readable size of an original without processing for setting a special reading mode and obtaining a combined image.

Means for Solving the Problems

An image processing apparatus of the present invention comprises an image reading unit reading a front side image and a rear side image from a front side and a rear side of a medium, respectively, a mark detecting unit detecting a combination instruction mark present in a predetermined position of at least one of the front side image and the rear side image, and an image combining unit combining a front side sliced image and a rear side sliced image sliced from predetermined positions of the front side image and the rear side image in a predetermined direction to obtain one image when the combination instruction mark is detected.

An image processing method of the present invention comprises reading a front side image and a rear side image from a front side and a rear side of a medium, respectively, detecting a combination instruction mark present in a predetermined position of at least one of the front side image and the rear side image, and combining a front side sliced image and a rear side sliced image sliced from predetermined positions of the front side image and the rear side image to obtain one image when the combination instruction mark is detected.

A carrier sheet of the present invention comprises two sheets having a rectangular shape and holding paper between the two sheets. At least each one side of the two sheets are fixed to each other. Each of the two sheets comprises at least one of a vertical reference line defining a position of a reference in a conveyance direction or a horizontal reference line being orthogonal to the vertical reference line and defining a reference in a direction orthogonal to the conveyance direction, an original area including an area which is colorless and transparent and an outer side surface of which is matted, with at least one side thereof defined by the vertical reference line or the horizontal reference line, and a frame area including a nontransparent area with at least one side thereof defined by the vertical reference line or the horizontal reference line. At least one of the two sheets comprises a combination instruction mark drawn in the frame area.

Advantages of the Invention

According to the image processing apparatus and method of the present invention, it is possible to combine a front side image and a rear side image into one image by detecting a combination instruction mark drawn in a position other than a position of the carrier sheet where an original is held. Therefore, it is unnecessary to perform setting operation for distinguishing a reading mode for a usual double-sided original (a division mode) and a mode for folding an original into two to read images (a combination mode). Since it is unnecessary to perform mode switching, it is possible to mix a usual double-sided original (an original not folded into two) and an original folded into two and continuously read images. Since the carrier sheet is used, the original folded into two is not twisted and an image on a front side and an image on a rear side are not misaligned. Thus, it is unnecessary to adjust heights (positions in a conveyance direction) of images in combining the images and it is easy to perform image processing.

According to the carrier sheet of the present invention, since the part of the carrier sheet for holding an original is matted, unlike a carrier sheet that is transparent and is not matted, light for reading is not excessively reflected on the surface of the carrier sheet and it is possible to read an image clearly. Since the roller does not slip on the surface of the carrier sheet and conveyance is stabilized, it is possible to read an image clearly.

DESCRIPTION OF SYMBOLS

Figure 1:
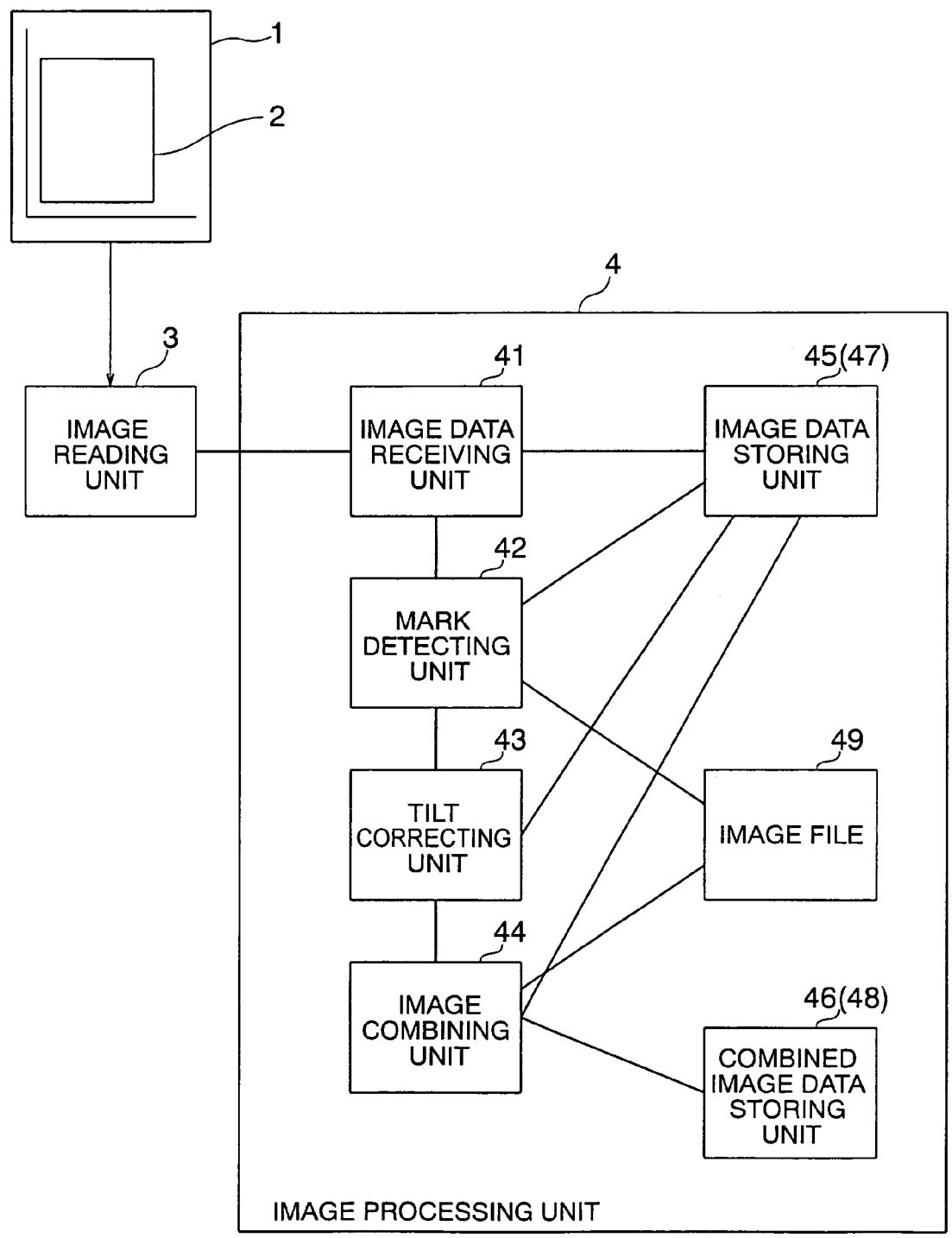
FIG. 1 is a diagram of an image processing apparatus.

1 Carrier sheet
2 Original
3 Image reading unit
4 Image processing unit
41 Image data receiving unit
42 Mark detecting unit
43 Tilt correcting unit
44 Image combining unit
45 Image data storing unit
46 Combined image data storing unit
49 Image file

BEST MODE FOR CARRYING OUT THE INVENTION

FIG. 1 is a diagram of an image processing apparatus and shows a structure of an image processing apparatus of the present invention. The image processing apparatus includes an image reading unit 3 and an image processing unit 4 connected to the image reading unit 3. The image reading unit 3 includes an image reading apparatus such as a scanner. The image processing unit 4 includes, for example, a personal computer connected to the image reading unit 3.

The image reading unit 3 reads a front side image and a rear side image from a front side and a rear side of a medium (1 or 2) and transmits the images to the image processing unit 4. The medium includes an original 2 (21) folded into two and held by the carrier sheet 1 or a usual original 2 (not held by the carrier sheet 1). The original 2 folded into two is a double-sided original having images present on both front and rear sides because the original is folded. The usual original 2 is a double-sided original, on both sides of which images are drawn. According to the present invention, it is unnecessary for the image reading unit 3 to distinguish such two kinds of originals 2. The image processing unit 4 applies predetermined processing to image data received from the image reading unit 3.

Figure 2:
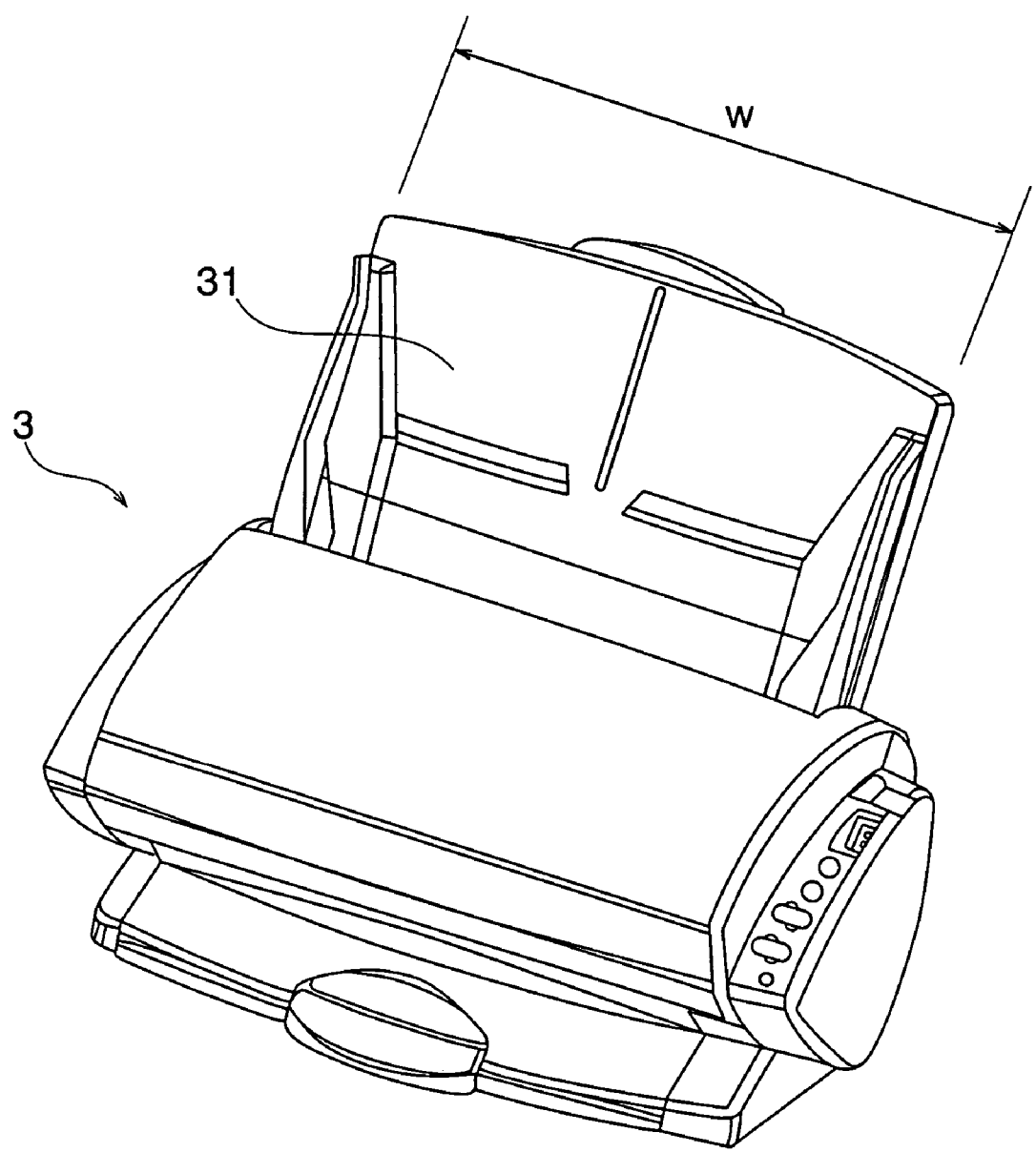
FIG. 2 is an external view of the image processing apparatus.
Figure 3:
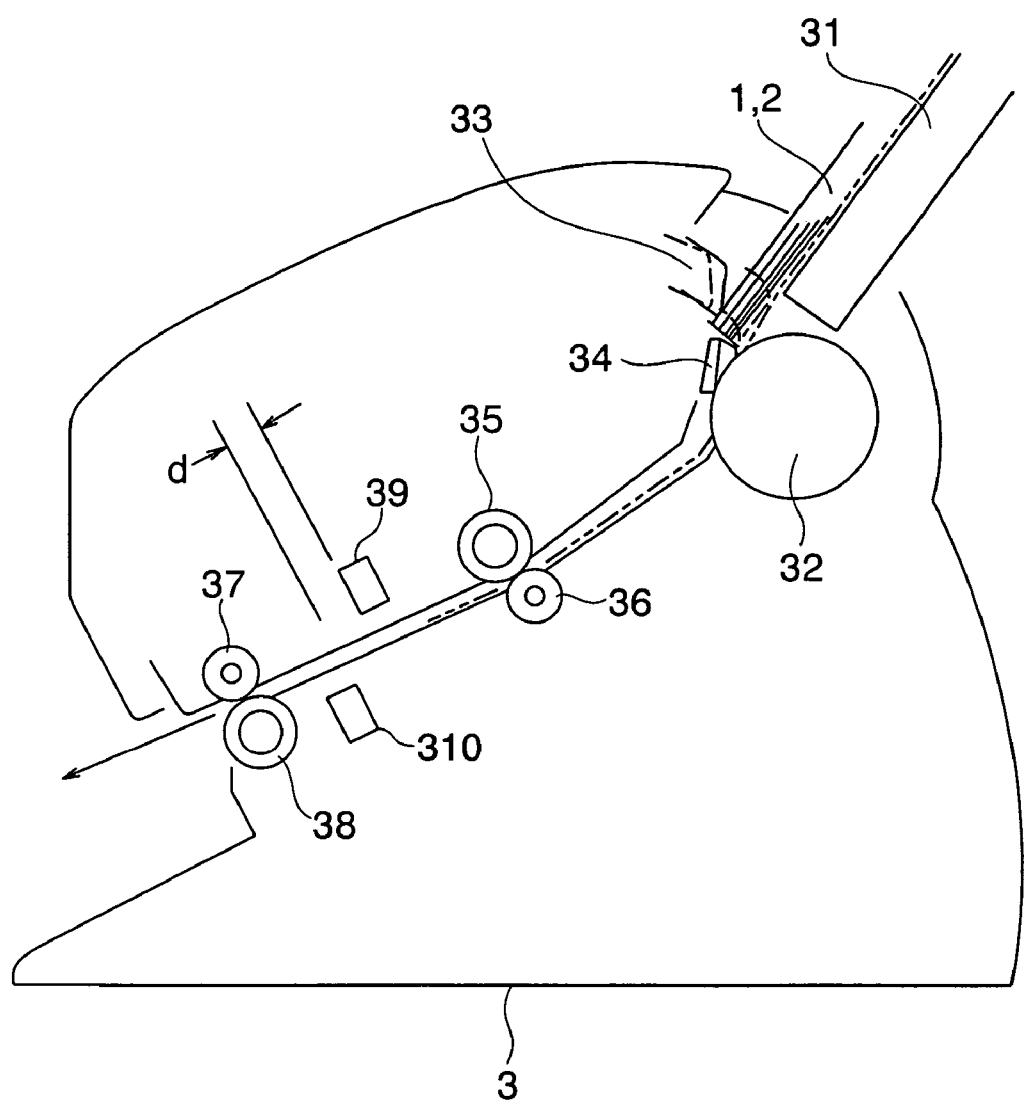
FIG. 3 is a schematic diagram of the image processing apparatus.

The scanner (hereinafter also referred to as scanner 3) serving as the image reading unit 3 is formed integrally with a sheet feeding apparatus as shown in FIGS. 2 and 3. Note that the scanner 3 shown in FIGS. 2 and 3 is an example of the image reading unit 3. The image reading unit 3 may be formed integrally with the image processing unit 4. It is possible to apply the present invention not only to the image processing apparatus including the scanner 3 but also to image processing apparatuses such as a copy machine and a facsimile.

As shown in FIG. 3, the sheet feeding device includes a paper mounting stand (a shooter) 31, a pick roller 32, a pick arm 33, a separating pad 34, a feed roller 35 and 36, and discharge rollers 37 and 38. In FIG. 3, an alternate long and two short dashes line indicates a conveyance path for the medium (1 or 2, hereinafter simply referred to as original 2 in some cases). The original 2 or the original 2 folded into two and held by the carrier sheet 1 is conveyed along the conveyance path. In order to read images on the front side and the rear side of the original 2, the scanner includes line sensors 39 and 310 including well-known CCDs (Charge Coupled Devices), respectively. Positions of the line sensors 39 and 310 are apart by a distance d in a direction of the conveyance path in order to perform reading of both the front and the rear sides substantially simultaneously without hindrance. Therefore, actual times for starting and ending reading of both the front and the rear sides are slightly different. In FIG. 3, the special line sensors 39 and 310 indicate approximate positions.

In this example, a maximum size of the original 2 readable by the scanner serving as the image reading unit 3 is A4 and a width of the original 2 is a predetermined value W. Therefore, a width of the paper mounting stand 31 is set slightly wider than W. Note that FIG. 2 indicates an approximate width. The originals 2 mounted on the paper mounting stand 31 are picked by the pick roller 32 in a state in which an appropriate pressing force is applied to the originals 2 by the pick arm 33. At this point, the originals 2 are separated one by one in order from a lower side by the pick roller 32 and the separating pad 34. The original 2 picked is further conveyed to the feed rollers 35 and 36 by the pick roller 32, conveyed to a reading position by the feed rollers 35 and 36, and discharged by the discharge rollers 37 and 38.

In the course of the conveyance, images of the original 2 are read by the line sensors 39 and 310 in the reading position. In other words, in a one-side reading mode, an image on the front side of the original 2 is read by, for example, the line sensor 39 (or the line sensor 310). In a both-side reading mode, images on the front side and the rear side of the original 2 are read by the line sensors 39 and 310, respectively, substantially simultaneously (for convenience of explanation, referred to as division mode) or images on the front side and the rear side of the original 2 (21) folded into two and held by the carrier sheet 1 are read by the line sensors 39 and 310, respectively, substantially simultaneously (for convenience of explanation, referred to as combination mode). The one-side reading mode and the both-side reading mode are set by a user prior to reading. In the both-side reading mode, according to the present invention, the scanner serving as the image reading unit 3 does not distinguish the division mode and the combination mode. In other words, in the both-side reading mode, the scanner does not have a function for distinguishing (setting distinction between) the division mode and the combination mode.

Figure 4A:
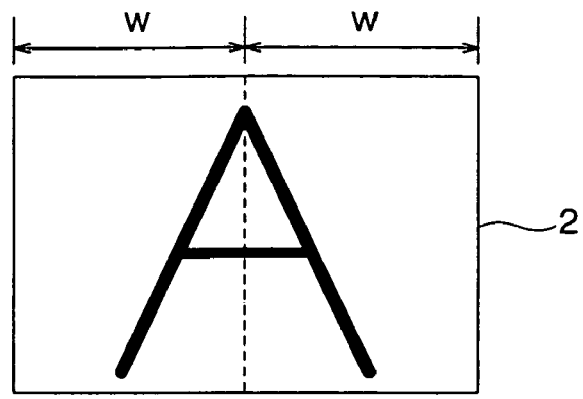
FIGS. 4A to 4D are diagrams for explaining image processing.

The original 2 of a size readable by the scanner serving as the image reading unit 3 is originally the original 21 of a half size of the large-sized original 2 shown in FIG. 4A. In this example, as shown in FIG. 2, the original 21 of a readable size is an original of an A4 size, a length of a short side of which is a standard value W. However, according to the present invention, as shown in FIG. 4A, the scanner 3 can also read the original 2 of a size twice as larger as the original 21 of an essentially readable size. The scanner 3 in this example can read the original 2 up to an A3 size that is a size of the original 2 of a size twice as large as the A4 size readable by the scanner 3. A length of a long side of the original 2 of the A3 size is a standard value 2 W, which is twice as large as the standard value W of the length of the short side of original 21 of the A4 size.

Figure 4B:
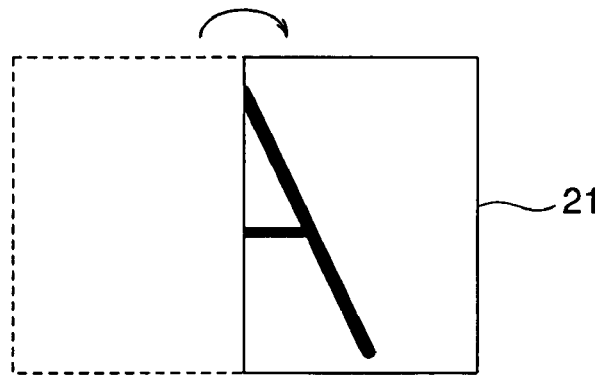
Figure 4C:
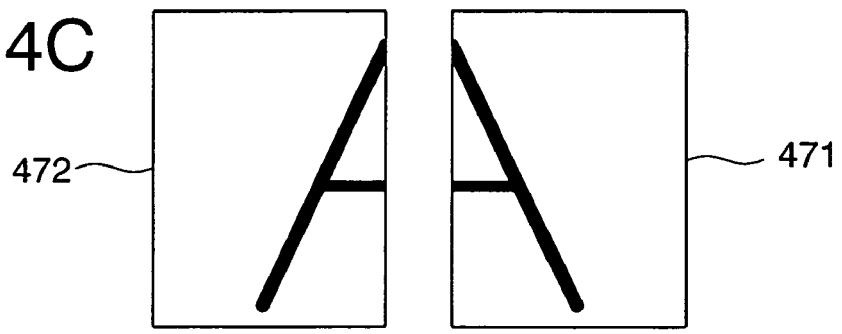
Figure 4D:
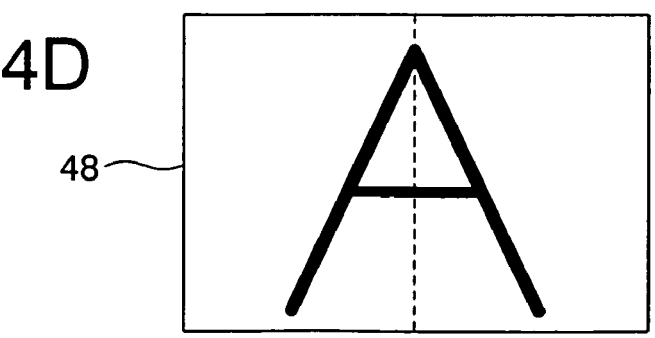

As shown in FIG. 4B, the original 2 of the A3 size twice as large as the original 21 of the A4 size is folded to be the doubled original 21. In other words, a width of the original is set to W, which is the same as that of the original 21 of the A4 size. Images on both sides of the doubled original 21 are read using the carrier sheet 1 described later. Consequently, as shown in FIG. 4C, two image data 471 and 472 are obtained. For convenience of explanation, the image data 471 is referred to as a front side image or front side image data and the image data 472 is referred to a rear side image or rear side image data (vice versa). The image processing unit 4 combines the front side image data 471 and the rear side image data 472 to obtain one image data 48 as shown in FIG. 4D.

Figure 5:
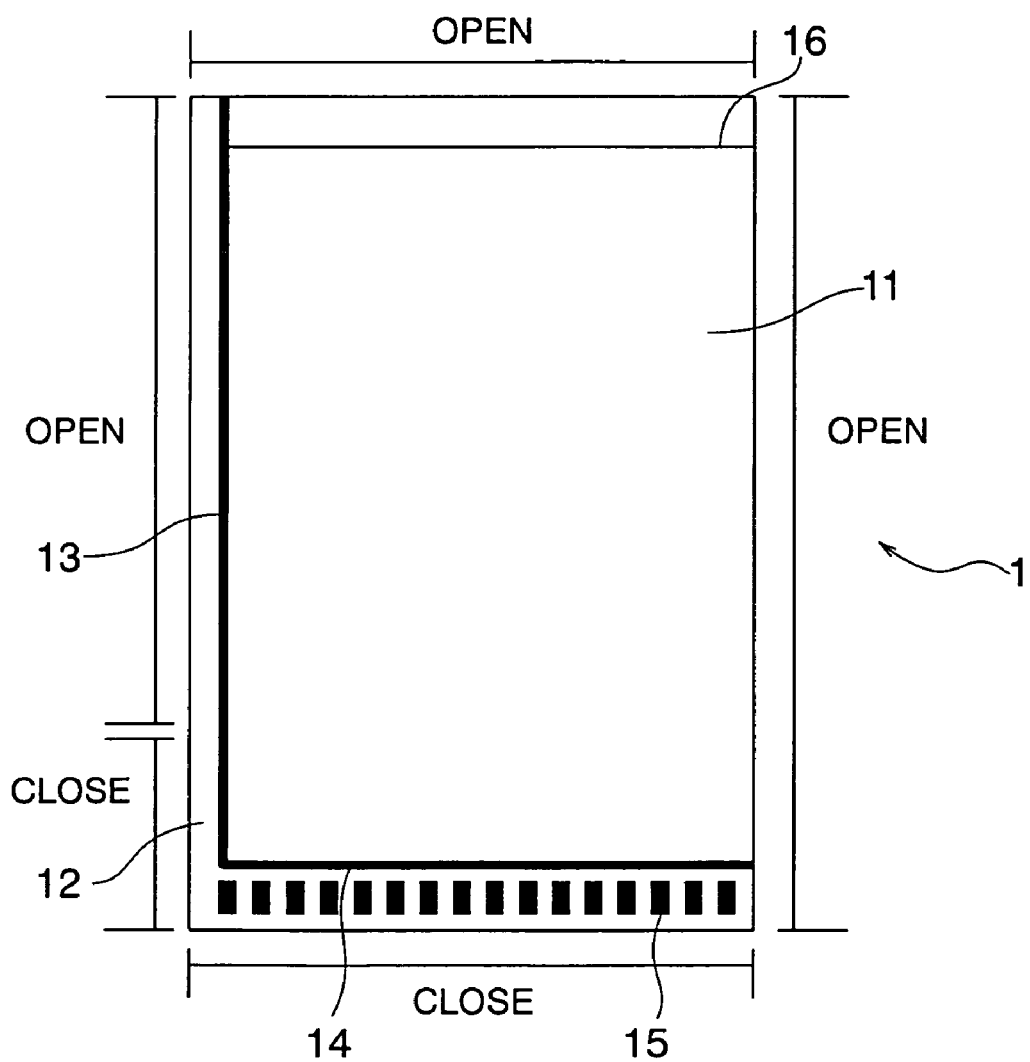
FIG. 5 is a diagram for explaining a carrier sheet.
Figure 6A:
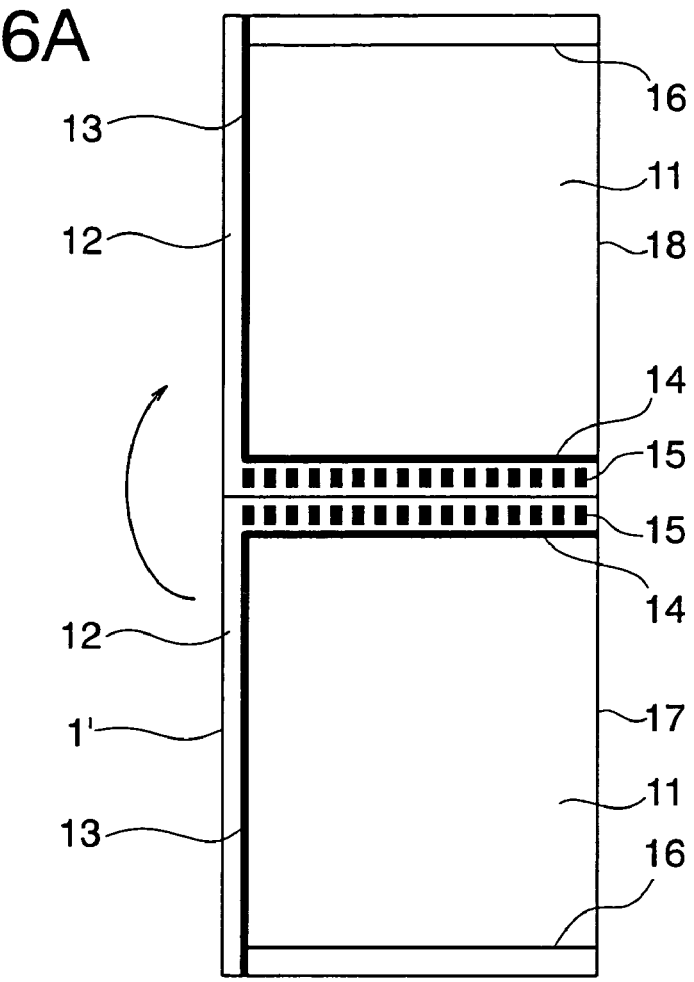
FIGS. 6A and 6B are diagrams for explaining the carrier sheet.
Figure 6B:
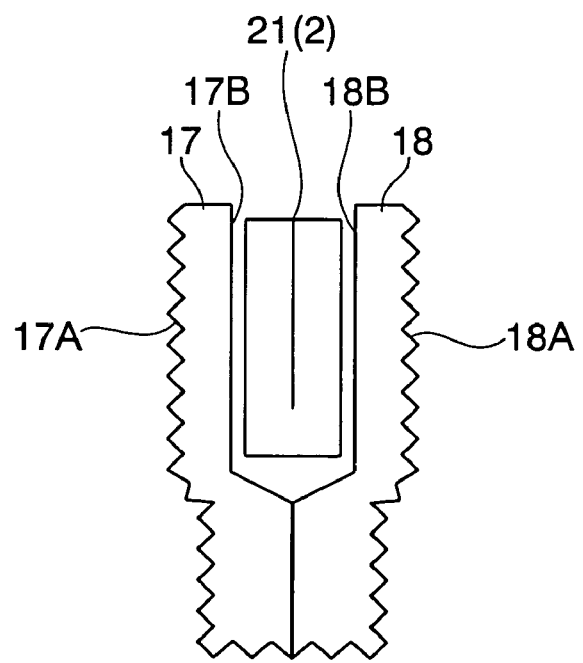
Figure 7:
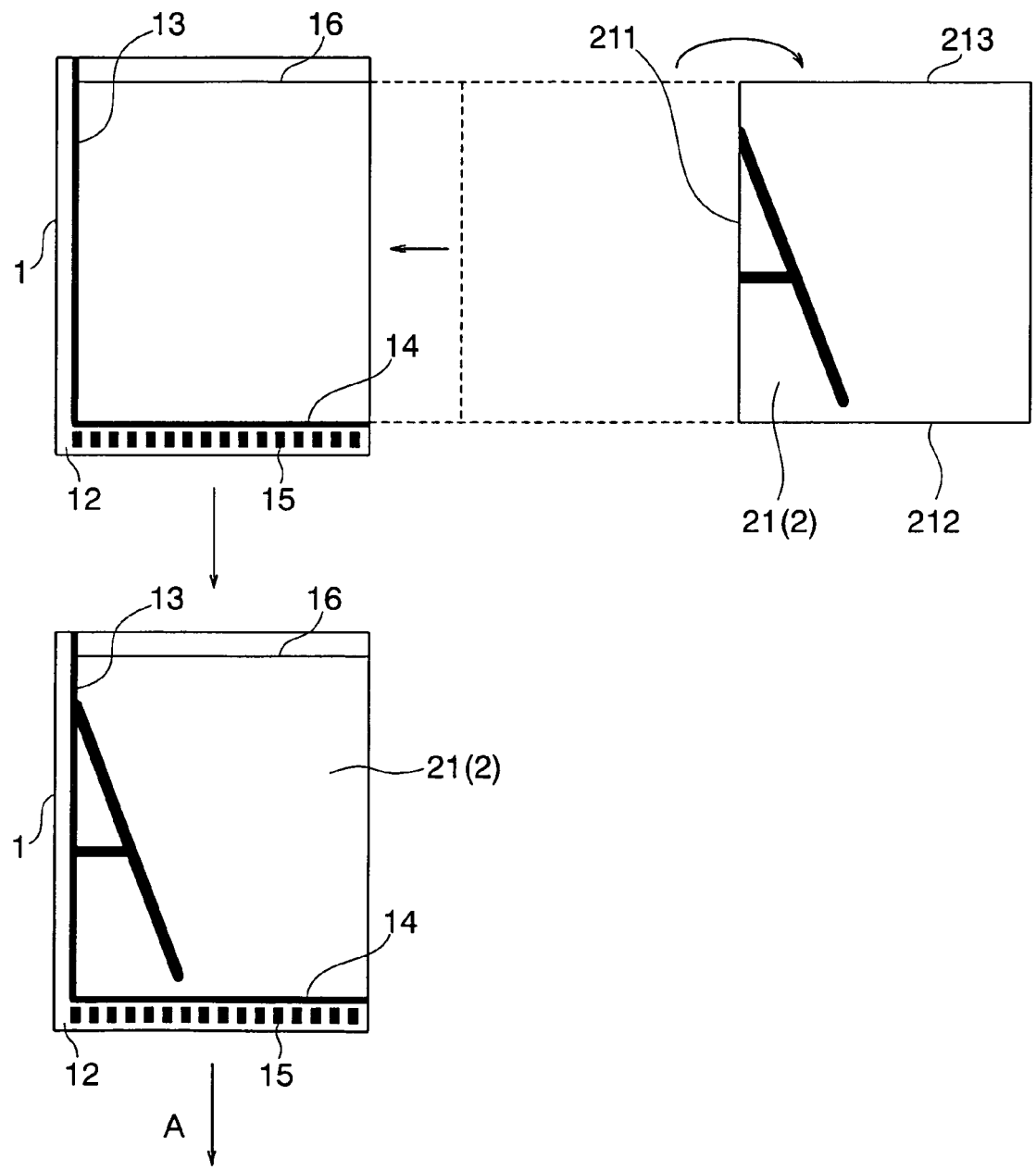
FIG. 7 is a diagram for explaining image processing.

For this purpose, in the present invention, the carrier sheet 1 shown in FIGS. 5 to 7 is used. As shown in FIG. 5, the carrier sheet 1 basically includes a film that has a rectangular shape long in a vertical direction (a conveying direction) and is colorless and transparent. A material of the carrier sheet 1 is, for example, a colorless and transparent polyester film. Total light transmittance of the carrier sheet 1 is, for example, 90%. A polyester film is suitable for such use because the polyester film has high flexibility. When the carrier sheet 1 is picked by the pick roller 32 and when the carrier sheet 1 is separated by the separating pad 34, the carrier sheet 1 can be treated in the same manner as the original 2 and is never twisted.

As shown in FIG. 6A, the carrier sheet 1 includes two sheets 17 and 18 having an identical shape (rectangular) with at least one sides thereof (for example, bases in FIG. 6A) fixed to each other by, for example, an adhesive. In FIG. 5, an area to be stuck is indicated by "CLOSE". Note that "OPEN" indicates that a side is not stuck. The two sheets 17 and 18 do not have to have completely an identical shape. For example, in a nontransparent area 12 described later, shapes of the sheets 17 and 18 may be different. Entire one side of the sheet 17 and entire one side of the sheet 18 do not have to be stuck. For example, a part of the bases does not have to be stuck in the centers of the bases.

As shown in FIG. 6B, the carrier sheet 1 is a sheet for holding the original 2 between the two sheets. In this example, in at least original areas 11 of the two sheets 17 and 18, planes 17A and 18A on outer sides when the original 2 (the doubled original 21) is held between the sheets 17 and 18 are abraded at predetermined roughness to be matted. In other words, the planes 17A and 18A are abraded to cease to be mirror surfaces. For example, (60°) mirror surface glossiness is set to 25%. Consequently, light made incident on the planes 17A and 18A on the outer sides is slightly reflected irregularly in proportion to a degree of the roughness. It is possible to prevent light for reading from being excessively reflected on the surfaces (the planes 17A and 18A on the outer sides) of the carrier sheet 1 by slightly roughening surfaces of the planes 17A and 18A on the outer sides.

On the other hand, planes 17B and 18B on inner sides when the original 2 is held between the two sheets 17 and 18 are never matted. In other words, the planes 17B and 18B are kept to be mirror surfaces. Since the planes 17B and 18B on the inner sides are flat, the planes 17B and 18B adhere to the surface of the doubled paper 21 (2) held between the sheets 17 and 18 (in FIG. 6B, gaps are provided for convenience of explanation). Therefore, light made incident on the planes 17B and 18B on the inner sides is transmitted through the two sheets 17 and 18 without irregularity and is reflected on the surface of the doubled paper 21 without irregularity. Consequently, it is possible to read an image on the doubled paper 21 without irregularity.

As shown in FIG. 6A, the two sheets 17 and 18 include an original area 11, a frame area 12, and at least one of a vertical reference line 13 and a horizontal reference line 14. In this example, the sheets 17 and 18 include both the vertical reference line 13 and the horizontal reference line 14. In the two sheets 17 and 18, when the two sheets 17 and 18 are laid one on top of another to form the carrier sheet 1, the vertical reference line 13 and the horizontal reference line 14 completely overlap with each other (coincide with each other). In other words, when the carrier sheet 1 is expanded with the base thereof as an axis, the vertical reference line 13 and the horizontal reference line 14 are made symmetrical. Therefore, in the two sheets 17 and 18, the original area 11 and the frame area 12 also completely overlap each other.

The original area 11 is an area where the original 21 held by the carrier sheet 1 should be located. The original area 11 includes an area, which is colorless and transparent and an outer side surface of which is matted, with at least one side thereof defined by the vertical reference line 13 and the horizontal reference line 14 (and an upper reference line 16). In this example, two sides are defined by the vertical reference line 13 and the horizontal reference line 14. An outer side surface of at least the original area 11 is matted because of a reason described later. In this example, the original area 11 has a size equivalent to the A4 size.

The frame area 12 includes a nontransparent area with at least one side thereof defined by the vertical reference line 13 or the horizontal reference line 14. In this example, two sides are defined by the vertical reference line 13 and the horizontal reference line 14. The frame area 12 is set to be nontransparent in a color suitable for a background color thereof in order to make it easier to identify the read vertical reference line 13, horizontal reference line 14, and combination instruction mark 15. Therefore, the frame area 12 is not provided in four sides of the carrier sheet 1 but is provided in two sides where the vertical reference line 13 and the horizontal reference line 14 are drawn. In this example, in order to highlight black, for example, a white ink is applied to the frame area 12 to make the frame area 12 nontransparent in white. The white ink is an ink of a color closer to, for example, a white reference of reading. The white ink is applied to the planes 17B and 18B on the inner sides of the two sheets 17 and 18. Similarly, the vertical reference line 13 and the like drawn with a block ink are also drawn in the planes 17B and 18B on the inner sides.

As described above, the frame area 12 (in the vertical direction) is also present between one side of the carrier sheet 1 and the vertical reference line 13. On a side on the opposite side of the frame area 12 in the vertical direction, when the doubled original 21 is correctly held by the carrier sheet 1, actually, a clearance of a predetermined width is also present. Therefore, a width of the carrier sheet 1 is slightly (for example, about a little less than 1 cm) wider than the standard value W of the short side of the original 21 of the A4 size.

The vertical reference line 13 defines a position of a reference in the conveyance direction. In other words, the vertical reference line 13 is a line drawn in black (a black ink, the same applies in the following description) in the vertical direction, that is, the conveyance direction. The vertical reference line 13 defines the original area 11 and defines a vertical boundary of the original area 11 and the frame area 12. The vertical reference line 13 is also used as a reference for combination of an image by the image combining unit 44. Consequently, the vertical reference line 13 is also used as a reference for image slicing. Therefore, the vertical reference line 13 is not provided in two vertical sides (in the longitudinal direction) of the carrier sheet 1 but is provided only in one side in the vertical direction in parallel with the side. The black ink is, for example, an ink of a color close to a black reference for reading (the same applies in the following description).

The horizontal reference line 14 is orthogonal to the vertical reference line 13 and defines a reference in a direction orthogonal to the conveyance direction. In other words, the horizontal reference line 14 is a line drawn in black in a horizontal direction that is a direction orthogonal to the vertical direction. The horizontal reference line 14 defines the original area 11 and defines a horizontal boundary of the original area 11 and the frame area 12. The reference line 14 is not provided in two horizontal sides (in a width direction) of the carrier sheet 1 but is provided only in one side in the horizontal direction (for example, the base) in parallel with the side. A space between the horizontal reference line 14 and the side (the base) of the carrier sheet 1 close to the horizontal reference line 14 is set wide in order to provide the combination instruction mark 15. In other words, a width of the frame area 12 in the space between the horizontal reference line 14 and the side of the carrier sheet 1 close to the horizontal reference line 14 is set sufficiently wider than a width of the frame area 12 between the vertical reference line 13 and the side of the carrier sheet 1 close to the vertical reference line 13.

At least one of the two sheets 17 and 18 includes the combination instruction mark 15 drawn in the frame area 12 (in the horizontal direction). The combination instruction mark 15 is drawn in a position along the horizontal reference line 14 in the frame area 12. Note that, as shown in FIG. 6A, the combination instruction marks 15 may be provided in both of the two sheets 17 and 18. In this case, in the same manner as the vertical reference line 13 and the like, when the two sheets 17 and 18 are laid one on top of another to form the carrier sheet 1, the combination instruction marks 15 of the two sheets 17 and 18 completely overlap each other.

Usually, the combination instruction mark 15 is formed in a shape that would not be drawn in the original area 11. In this example, as shown in FIG. 5, the combination instruction mark 15 is formed in a shape like an extremely bold dotted line extending over the entire area of the horizontal reference line 14. Consequently, it is possible to clearly distinguish the combination instruction mark 15 from the horizontal reference line 14 and surely detect the combination instruction mark 15. Note that a pattern of the combination instruction mark 15 may be varied to give predetermined meanings to the combination instruction mark 15 in the same manner as barcodes such that various kinds of combination processing can be selectively executed.

The frame area 12 or the area in which the combination instruction mark 15 is drawn is used as an area for adhesion of the two sheets 17 and 18. This area has a width to some extent as it is seen from FIG. 5 and the like. Therefore, it is possible to secure adhesive strength of the two sheets 17 and 18 by sticking an entire surface of the area.

At least one of the two sheets 17 and 18 includes the upper reference line 16 drawn in the original area 11. The upper reference line 16 is drawn in a direction along a side on the opposite side of the horizontal reference line 14 in the original area 11. Note that, as shown in FIG. 6A, the upper reference lines 16 may be provided in both of the two sheets 17 and 18. In this case, in the same manner as the vertical reference line 13 and the like, when the two sheets 17 and 18 are laid one on top of another to form the carrier sheet 1, the upper reference lines 16 of the two sheets 17 and 18 completely overlap each other.

The carrier sheet 1 described above is used as shown in FIG. 7. Firstly, the original 2 of the A3 size is folded into two in the center thereof to form the doubled original 21. Subsequently, the doubled original 21 is held between the two sheets 17 and 18 of the carrier sheet 1. At this point, a fold 211 of the doubled original 21 is adjusted to the vertical reference line 13 and a base 212 of the doubled original 21 is adjusted to the horizontal reference line 14. As a result, an upper side 213 of the doubled original 21 is set on the upper reference line 16. Consequently, the doubled original 21 is correctly held by the carrier sheet 1. In other words, the doubled original 21 is located in the original area 11 (in a narrow sense) in the carrier sheet 1.

Note that, as shown in FIG. 5, in the actual carrier sheet 1, the frame areas 12 of the two sheets 17 and 18 are stuck in a part of the side where the vertical reference line 13 is provided. In other words, in the side, the frame area 12 in a part of a side (a base side) where the horizontal reference line 14 is provided, that is, an area not marked "OPEN" is stuck. Consequently, in holding the doubled original 21 in the carrier sheet 1, it is possible to bring the doubled original 21 into abutment against the stuck frame area 12 and make it easy to hold the doubled original 21 in a predetermined position.

The carrier sheet 1 holding the doubled original 21 is inserted into the scanner serving as the image reading unit 3 in a direction of an arrow A shown in FIG. 7. In other words, the carrier sheet 1 is set in a lengthwise direction with the side, where the two sheets 17 and 18 of the carrier sheet 1 are stuck, as the front and inserted. An arrow A indicates a direction coinciding with the conveyance direction in the scanner.

Referring back to FIG. 1, the image processing unit 4 includes an image data receiving unit 41, a mark detecting unit 42, a tilt correcting unit 43, an image combining unit 44, an image data storing unit 45, a combined image data storing unit 46, and an image file 49. The image data receiving unit 41, the mark detecting unit 42, the tilt correcting unit 43, and the image combining unit 44 are realized by executing, on a CPU, the processing programs for the units present on a main memory of a personal computer. It is possible to supply the processing programs by storing the processing programs in a medium such as a CD-ROM or downloading the processing programs via a network.

Figure 8:
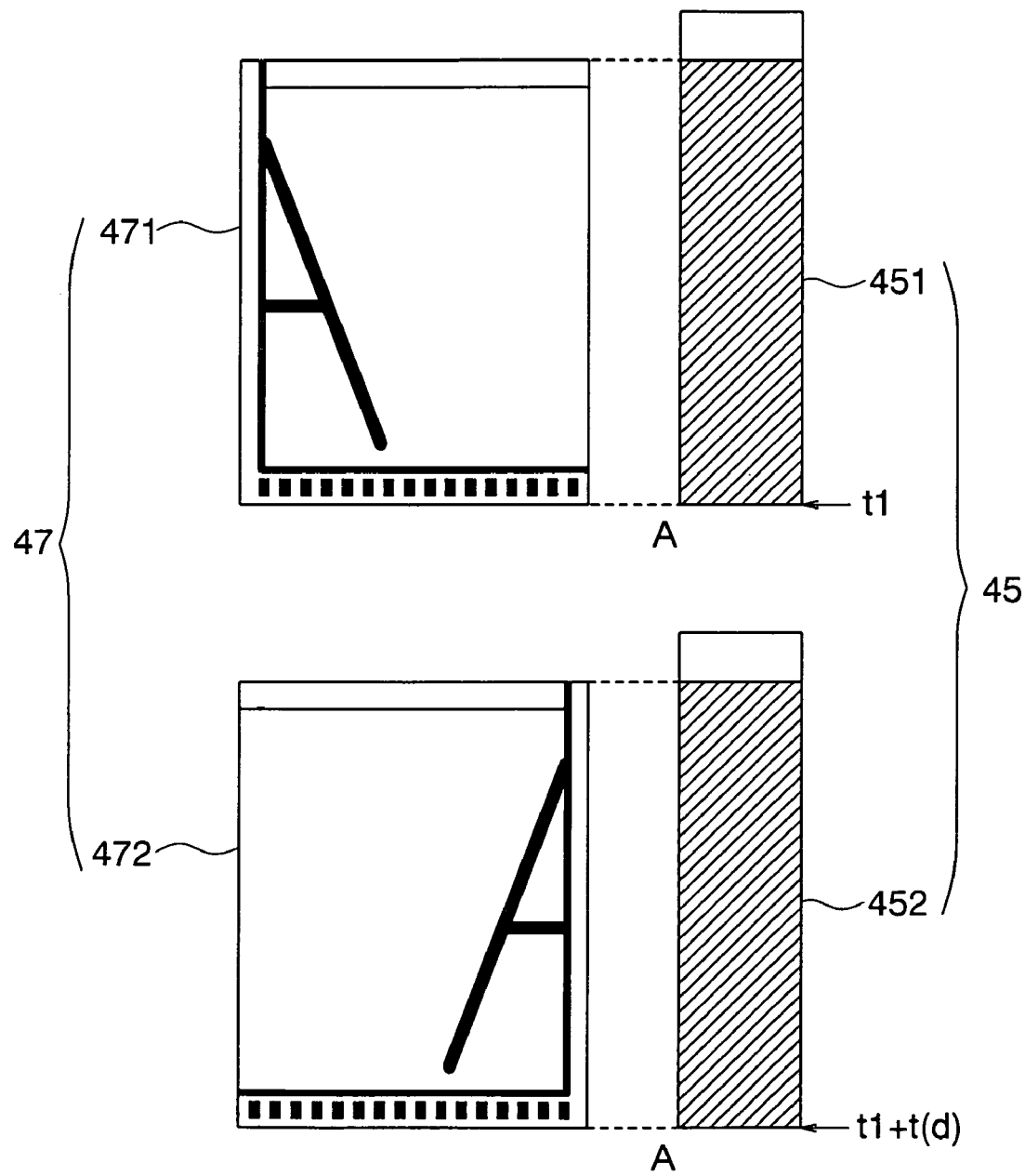
FIG. 8 is a diagram for explaining the image processing.

The image data receiving unit 41 receives the front side image (data) 471 and the rear side image (data) 472, which are read from the front side and the rear side of the medium (the original 2), from the image reading unit 3 and stores the images in the image data storing unit 45. In other words, as shown in FIG. 8, the image data receiving unit 41 stores the front side image 471 and the rear side image 472 in image memories 451 and 452 comprising the image data storing unit 45, respectively. At this point, as described above, since the positions of the line sensors 39 and 310 are apart by the distance d, when the front side image 471 is received at time t1, the rear side image 472 is received at time t1+t(d). t(d) is time required for conveying the original 2 or 21 by the distance d. Thus, the image data receiving unit 41 starts storage of the front side image 471 in the image memory 451 at the time t1 from an address A and starts storage of the rear side image 472 in the image memory 452 at the time t1+t(d) from the identical address A. Consequently, basically, an original image is obtained by simply combining the images in the image memories 451 and 452 for the identical address.

The mark detecting unit 42 detects the combination instruction mark 15 present in a predetermined position of at least one of the front side image 471 and the rear side image 472. The front side image 471 and the rear side image 472 are stored as shown in FIG. 8. Therefore, firstly, the mark detecting unit 42 detects the horizontal reference line 14 and searches for the combination instruction mark 15 only between the horizontal reference line 14 and heads of the images. Since the horizontal reference line 14 is longer than the width W of the original, in the horizontal direction, the horizontal reference line 14 is always the longest area in which black pixels continue. Therefore, it is possible to easily detect the horizontal reference line 14. A size and a position of the combination instruction mark 15 are known. Therefore, the mark detecting unit 42 checks whether an area of black pixels of the size is present in the position in the search area described above. The mark detecting unit 42 executes this processing for each of the front side image 471 and the rear side image 472 (therefore, twice). The above described search area is set in advance with a predetermined clearance taking into account a tilt and the like of the original 2 or 21.

When the combination instruction mark 15 is not detected, the mark detecting unit 42 sets each of the front side image 471 and the rear side image 472 as individual one image. At the time of reading, it is unknown whether a medium is the original 2 or the doubled original 21. In other words, according to the present invention, it is unnecessary to be conscious of whether an original is the original 2 or the doubled original 21. When the combination instruction mark 15 is not detected, it is seen for the first time that the medium read is the original (double-sided original) 2 on both sides of which images are drawn. This is not an object of combination of images. Thus, the mark detecting unit 42 creates a file in which the front side image 471 is stored and a file in which the rear side image 472 is stored independently and stores the files in the image file 49. Since an unnecessary segment or the like such as the vertical reference line 13 is not originally present in the read images, the images may be directly used as image files.

Figure 9A:
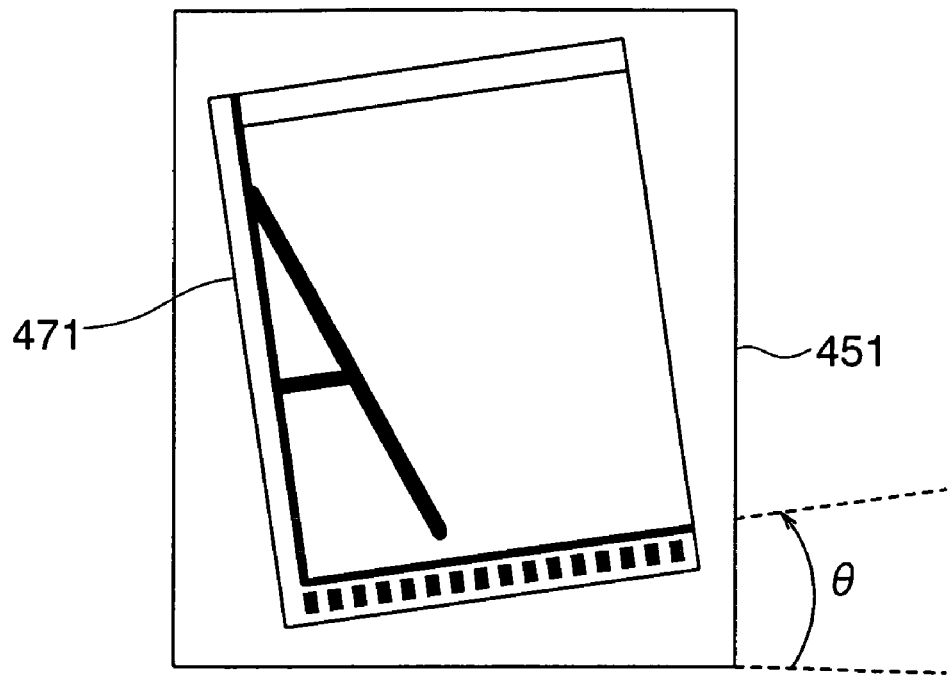
FIGS. 9A and 9B are diagrams for explaining the image processing.

When the combination instruction mark 15 is detected, the tilt correcting unit 43 corrects tilts of the front side image 471 and the rear side image 472 with the vertical reference line 13 and the horizontal reference line 14 present in predetermined positions of the front side image 471 and the rear side image 472 as references. For example, when a user inserts the carrier sheet 1 askew in the scanner 3, as shown in FIG. 9A, the read front side image 471 is an oblique image in the image memory 451 serving as a bit map memory. As described above, in the horizontal direction, the horizontal reference line 14 is always the longest area in which black pixels continue. A (original) position of the horizontal reference line 14 is known. The same is true for the vertical reference line 13. Therefore, it is possible to easily detect the vertical reference line 13 and the horizontal reference line 14. A search area for the detection is set in advance with a predetermined clearance taking into account the tilt and the like.

Figure 9B:
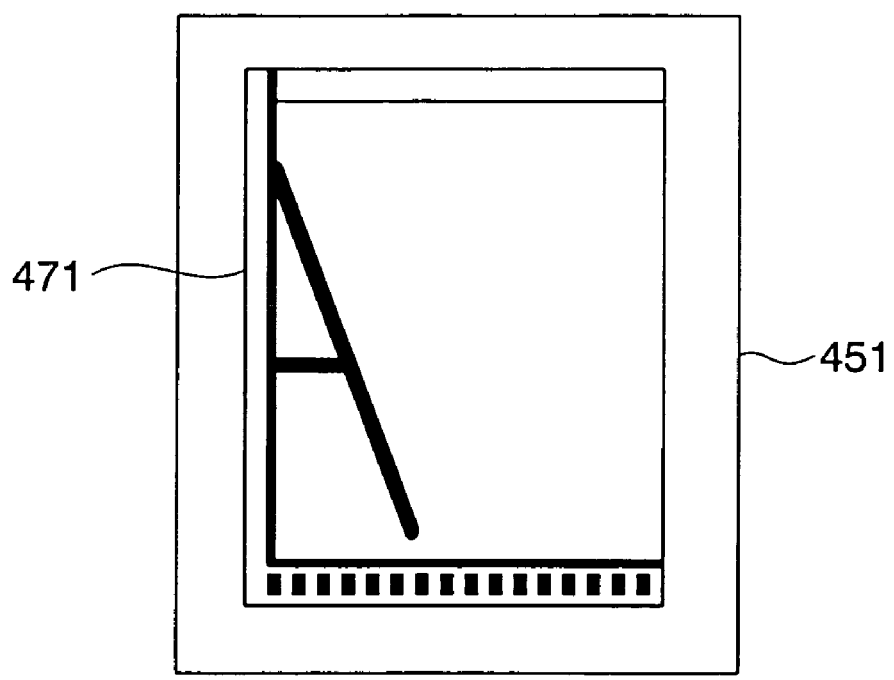

The tilt correcting unit 43 calculates, for example, tilts of the vertical reference line 13 and the horizontal reference line 14 in the front side image 471 and averages the tilts to calculate a tilt θ. Using this tilt θ, the tilt correcting unit 43 corrects the tilt of the front side image 471 in the image memory 451 with well-known unit to obtain the front side image 471 without a tilt as shown in FIG. 9B. The same is true for the rear side image 472.

Figure 10:
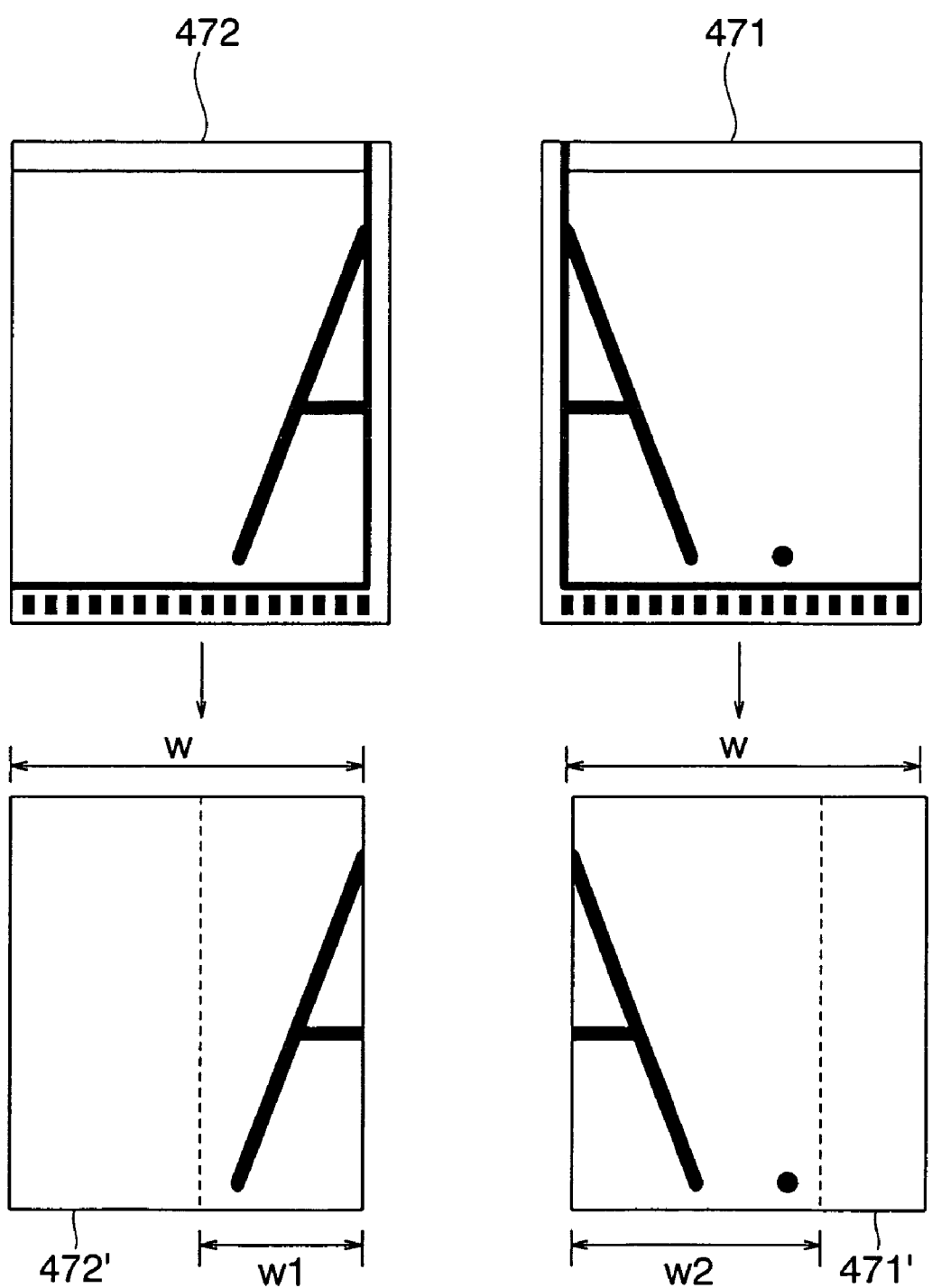
FIG. 10 is a diagram for explaining the image processing.
Figure 11:
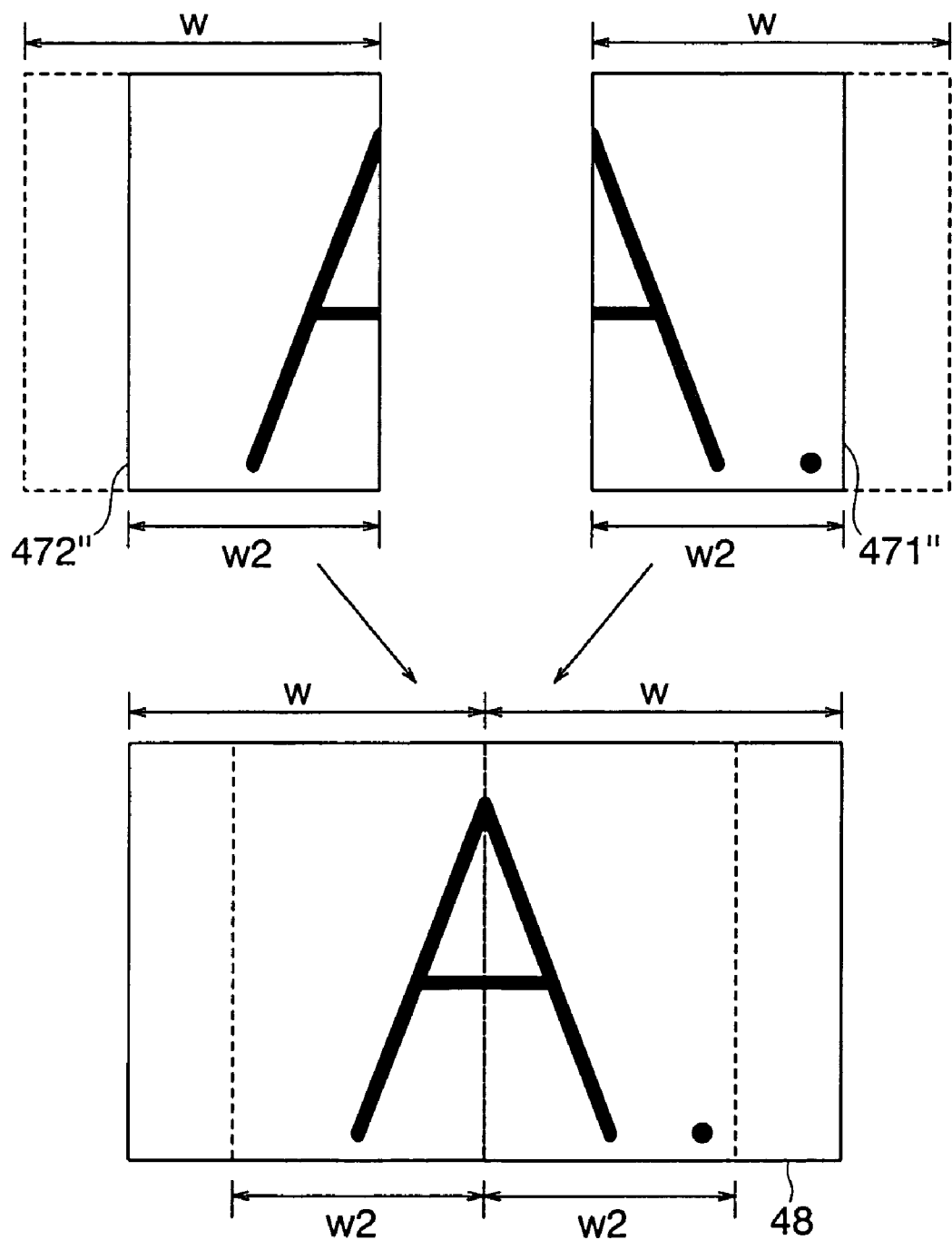
FIG. 11 is a diagram for explaining the image processing.

When the combination instruction mark 15 is detected, the image combining unit 44 learns that a read medium is the doubled original 21 held by the carrier sheet 1 because the combination instruction mark 15 is detected. This is an object of combination of images. Thus, as shown in FIGS. 10 and 11, the image combining unit 44 combines a front side sliced image and a rear side sliced image sliced from predetermined positions of the front side image 471 and the rear side image 472 in a predetermined direction to obtain one image and stores the image in the combined image data storing unit 46.

Firstly, the image combining unit 44 excludes unnecessary images from the front side image 471 and the rear side image 472. For example, as shown in FIG. 10, the image combining unit 44 deletes images on the outer sides of the vertical reference line 13 and the horizontal reference line 14 based on the vertical reference line 13 and the horizontal reference line 14 and obtains a front side image 471' and a rear side image 472'. Subsequently, the image combining unit 44 finds effective ranges in the front side image 471' and the rear side image 472'. For example, when an original image is an image like "A." and the image is folded into two in the center of the character A, the image changes as shown in FIG. 10. For convenience of explanation, FIG. 10 shows only an effective range in the horizontal direction. However, the same applies in the vertical direction (the same applies in the following description). A width of the effective range in the front side image 471' is W2 and a width of the effective range in the rear side image 472' is W1. Note that, actually, deletion of images on the outer side is omitted and the identical result is obtained by processing for determining effective ranges.

It is possible to find an effective range of an image with well-known various units. For example, an effective range of an image may be found by labeling. The image combining unit 44 consolidate continuous black pixels as groups, attaches label to the respective groups, judges whether an area is an effective area (an area forming an image) for each of the labels, excludes ineffective areas (areas that are not the vertical reference line 13 and the like and dust and the like), and, when an intersection of the vertical reference line 13 and the horizontal reference line 14 is set as an origin, adopts a coordinate value of a black pixel with the largest coordinate among the effective areas or a value larger than the coordinate value by a predetermined value as the effective range. Alternatively, the image combining unit 44 may exclude the vertical reference line 13 and the like, extracts an area in which black pixels of a predetermined size continue, and adopts the largest coordinate value among pixels in the extracted area or a value larger than the largest coordinate value by a predetermined value as the effective range.

Subsequently, the image combining unit 44 selects a larger one of the effective ranges in the front side image 471' and the rear side image 472'. In the case of this example, the width W2 in the effective range in the front side image 471' is larger than the width W1 of the effective range in the rear side image 472'. Therefore, as shown in FIG. 11, the image combining unit 44 selects a range 471" with the width W2 as the effective range in the front side image 471' and selects a range 472" with the width W2 (not W1) as the effective range in the rear side image 472'.

In coordinates (X coordinates) defining an effective range in the horizontal direction, one of the coordinates (on the origin side) is the vertical reference line 13 and the other is the coordinate value of the black pixel with largest coordinates (farthest from the origin) among the effective areas. Similarly, in coordinates (Y coordinates) defining an effective range in the vertical direction, one of the coordinates (on the origin side) is the horizontal reference line 14 and the other is the coordinate value of the black pixel with largest coordinates (farthest from the origin) among the effective areas.

Subsequently, the image combining unit 44 determines a formal size larger than the selected effective range and closest to a size of the effective range as a size of an image. In the case of this example, the selected effective range is an area of a sum of the range 471" with the width W2 and the area 472" with the width W2. As a result, a formal size larger than the area of the sum and close to a size of the area is, for example, the A3 size with the width 2 W. Thus, the image combining unit 44 combines images with the determined size into one image 48 using the front side image 471" and the rear side image 472". At this point, an area equivalent to a difference between the front side image 471 and the front side image 471" is set as, for example, a background color of the images by the image combining unit 44. The same applies to the rear side image 472". For example, the image combining unit 44 reads out the front side image 471" and the rear side image 472", writes the front side image 471" and the rear side image 472" in a corresponding position (a position equivalent to FIG. 11) of the combined image data storing unit 46, and writes data of the background color of the image in an area of the combined image data storing unit 46 corresponding to the difference. In this way, the image combining unit 44 stores the combined image 48 in the image file 49 as one file.

Figure 12:
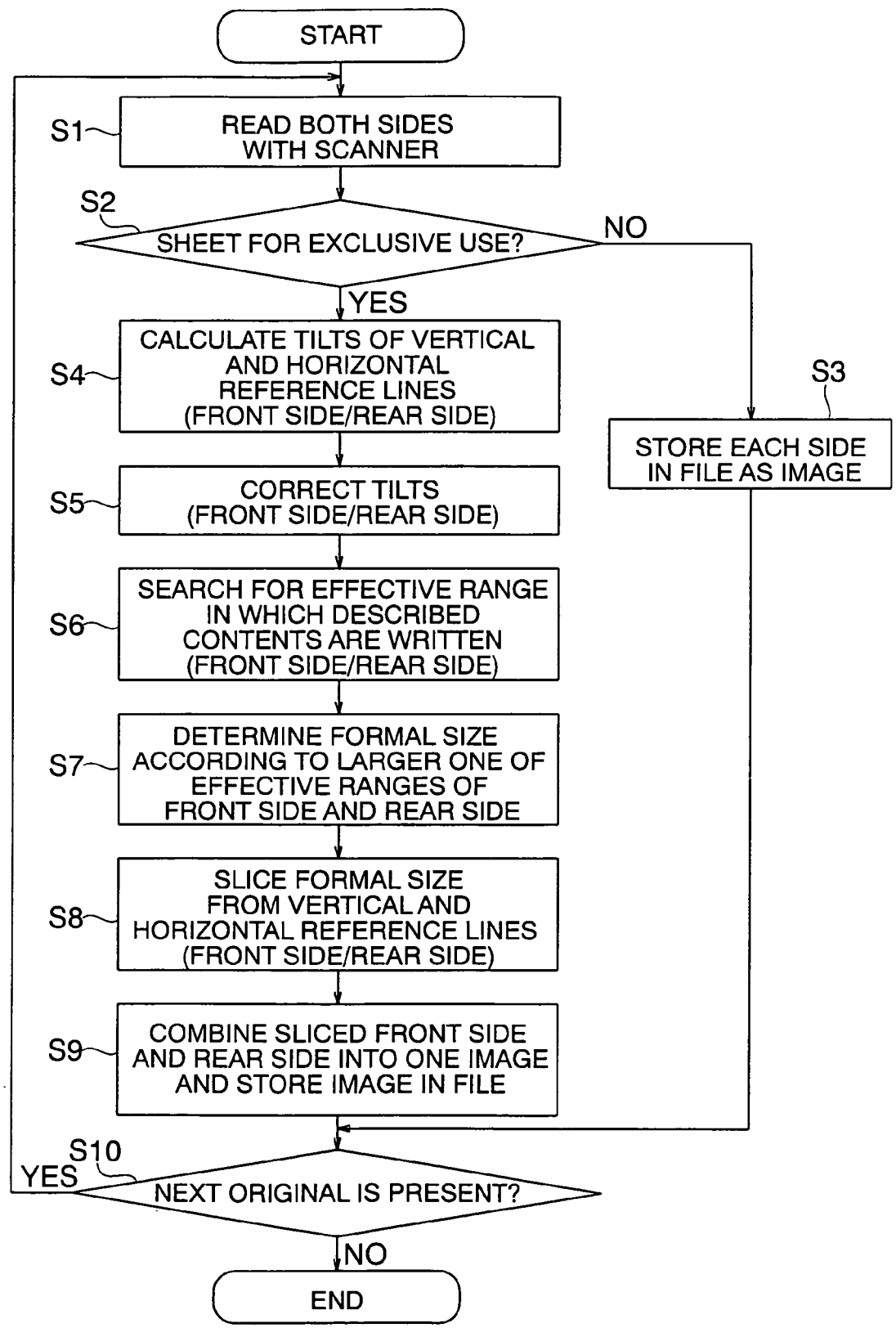
FIG. 12 is a flowchart of an image processing.

FIG. 12 is a flowchart of an image processing and shows image processing in the image processing apparatus shown in FIG. 1 of the present invention. In a state in which the both-side reading mode is set, the scanner serving as the image reading unit 3 reads images (image data) on both sides of the original 2 or the doubled original 21 held by the carrier sheet 1 shown in FIG. 7 (step S1) and transmits the images to the image data receiving unit 41 of the image processing unit 4. As shown in FIG. 8, the image data receiving unit 41 having received the images stores the received images in the image data storing unit 45. In other words, the image data receiving unit 41 obtains the front side image (data) 471 and the rear side image (data) 472 in the image memories 451 and 452.

The mark detecting unit 42 checks whether the reading of the front side image 471 and the rear side image 472 is reading by the carrier sheet 1 for exclusive use (step S2). In other words, the mark detecting unit 42 checks whether it is possible to detect the combination instruction mark 15 in the predetermined position for each of the front side image 471 and the rear side image 472. When the combination instruction mark 15 is not detected from both the front side image 471 and the rear side image 472, that is, when the reading is not reading by the carrier sheet 1, since the scanner is in the usual both-side reading mode (division mode), the mark detecting unit 42 stores each side of the front side image 471 and the rear side image 472 in the image file 49 as independent one image (image data) (step S3).

When the combination instruction mark 15 is detected from at least one of the front side image 471 and the rear side image 472, that is, the reading is reading by the carrier sheet 1, the mark detecting unit 42 notifies the tilt correcting unit 43 to that effect. The tilt correcting unit 43 having received the notification calculates tilts of the vertical reference line 13 and the horizontal reference line 14 for both the front side image 471 and the rear side image 472 (step S4) and corrects the tilts of both the front side image 471 and the rear side image 472 (step S5). The tilt correcting unit 43 notifies the image combining unit 44 of the end of the tilt correction processing.

The image combining unit 44 having received this notification searches for effective ranges in the area of the original 2 or the original area 11 of the carrier sheet 1 for both the front side image 471 and the rear side image 472 (step S6). The image combining unit 44 determines a formal size according to a larger one of the effective ranges of the front side image 471 and the rear side image 472 (step S7). The image combining unit 44 slices a front side sliced image and a rear side sliced image from both the front side image 471 and the rear side image 472 out to the combined image data storing unit 46 (step S8). The image combining unit 44 combines the front side sliced image and the rear side sliced image into one image and stores the image in the image file 49 as one file (step S9). The image combining unit 44 notifies the image reading unit 3 of the end of the image combination processing.

The image reading unit 3 having received this notification checks whether there is the next original 2 or 21 (step S1). When there is no original 2 or 21, the image reading unit 3 ends the processing. When there is the original 2 or 21, the image reading unit 3 repeats the step S1 and the subsequent steps.

Figure 13:
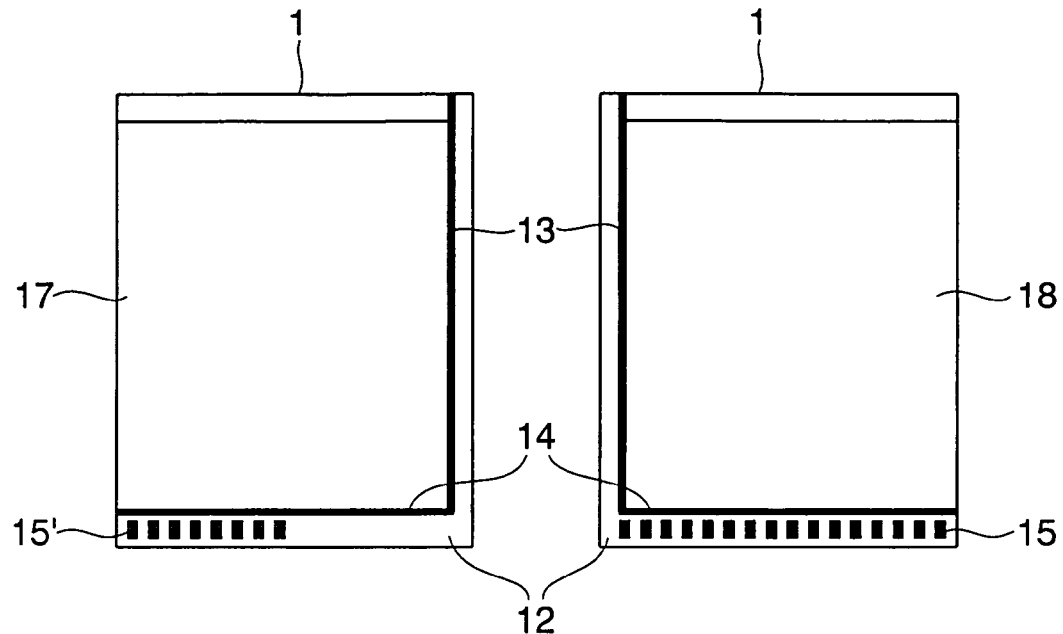
FIG. 13 is a diagram for explaining the carrier sheet.

FIG. 13 is a diagram for explaining a carrier sheet and shows an example of another carrier sheet 1 of the present invention. In the carrier sheet 1 of this example, one of two sheets (for example, the sheet 18) includes the combination instruction mark 15 drawn in the frame area 12 and the other of the two sheets (for example, the sheet 17) includes a non-combination instruction mark 15' drawn in the frame area 12. The non-combination instruction mark 15' has a shape different from that of the combination instruction mark 15. In this case, while the combination instruction mark 15 has a shape like a bold dotted line over an entire area in the short side direction, the non-combination instruction mark 15' has a shape like a bold dotted line only for a half in the short side direction. Note that the shape of the non-combination instruction mark 15' is not limited to this and may be, for example, other shapes such as an alternate long and short dash line and a dotted line in which respective dots are long.

When this carrier sheet 1 is used, both the combination instruction mark 15 and the non-combination instruction mark 15' are detected. Thus, the mark detecting unit 42 decides any one of a front side image and a rear side image as a priority image in which a mark detected in the image is given priority. For example, the front side image is set as the priority image (vice versa).

When the mark detecting unit 42 detects the non-combination instruction mark 15' present in a predetermined position of the front side image decided as the priority image, the mark detecting unit 42 neglects the combination instruction mark 15 detected from the rear side image not decided as the priority image and performs the same processing as the case in which the combination instruction mark 15 is not detected (the processing in the step S3). In other words, the mark detecting unit 42 sets each of a front side sliced image and a rear side sliced image sliced from predetermined positions of the front side image and the rear side image as individual one image. In this way, even if images are not combined, it is possible to protect the photograph original 2, a surface of which is easily scratched, and the original 2 made of thin paper from damages during conveyance by using the carrier sheet 1. Additionally, since the roller does not slip on the surface of the carrier sheet 1 and conveyance is stabilized, it is possible to read an image clearly.

Figure 14:
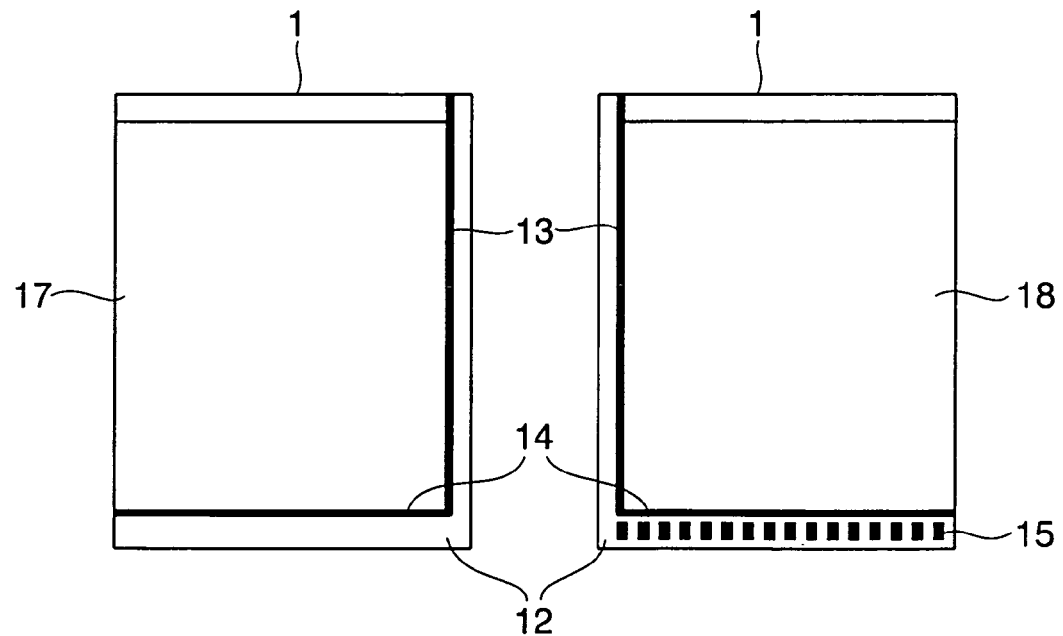
FIG. 14 is a diagram for explaining the carrier sheet.

FIG. 14 is a diagram for explaining a carrier sheet and shows still another example of the carrier sheet 1 of the present invention. In the carrier sheet 1 in this example, one of two sheets (for example, the sheet 18) includes the combination instruction mark 15 drawn in the frame area 12 and the other of the two sheets (for example, the sheet 17) does not include the combination instruction mark 15.

When the carrier sheet 1 is used, while the combination instruction mark 15 is detected in one image, the combination instruction mark 15 is not detected in the other image. Also, in this case, the mark detecting unit 42 decides any one of a front side image and a rear side image as a priority image in which a mark detected in the images is given priority. For example, the front side image is set as the priority image (vice versa).

When the mark detecting unit 42 does not detect the combination instruction mark 15 from the front side image decided as the priority image, the mark detecting unit 42 neglects the combination instruction mark 15 detected from the rear side image not decided as the priority image and performs the processing in the step S3 as described above. In other words, the mark detecting unit 42 sets each of a front side sliced image and a rear side sliced image sliced from predetermined positions of the front side image and the rear side image as individual one image.

Figure 15:
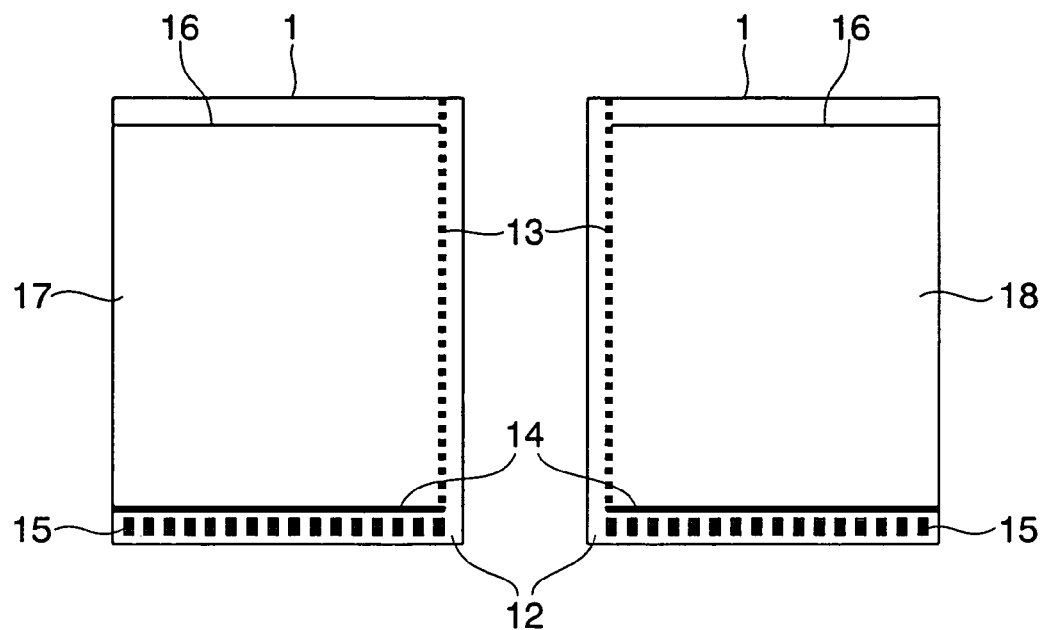
FIG. 15 is a diagram for explaining the carrier sheet.

FIG. 15 is a diagram for explaining a carrier sheet and shows an example of still another example of the carrier sheet 1 of the present invention. In the carrier sheet 1 in this example, each of the two sheets 17 and 18 includes (only) the horizontal reference line 14. The vertical reference line 13 is not provided. Note that, for reference, the vertical reference line 13 not present in the sheets is indicated by a dotted line. The upper reference line 16 may be provided or does not have to be provided.

Even if the vertical reference line 13 is not provided, it is possible to hold the original 2 (21) in an accurate position with the horizontal reference line 14 as a reference. Note that, in this case, it is also possible that the OPEN portions along the vertical reference line 13 shown in FIG. 5 are stuck together and a stuck portion of the two sheets 17 and 18 (therefore, practically, the vertical reference line 13) is set as a reference. As it is seen from FIG. 9A, when the tilt θ is calculated with the horizontal reference line 14 as a reference, since the same applies in the vertical direction, there is no hindrance in the tilt correction. As a reference for combination, as described above, since a width of reading of the scanner 3 is wider than the maximum width W of the original 2, it is sufficient to detect an edge of the original 2 based on a difference between a white reference (not shown) for reading and a color of the original 2 (21) and use the edge of the original 2. Consequently, it is possible to perform the same processing as the case in which the vertical reference line 13 is provided.

In this example, at least one of the two sheets 17 and 18 includes the combination instruction mark 15 drawn in the frame area 12 between the horizontal reference line 14 and the side of the sheet 17 or 18. Since a direction of the combination instruction mark 15 is the conveyance direction, it is possible to cope with reading of the combination instruction mark 15 even if the width of the scanner 3 is not increased. Note that, as described above, the non-combination instruction mark 15' may be provided in a corresponding position on the rear side.

Figure 16:
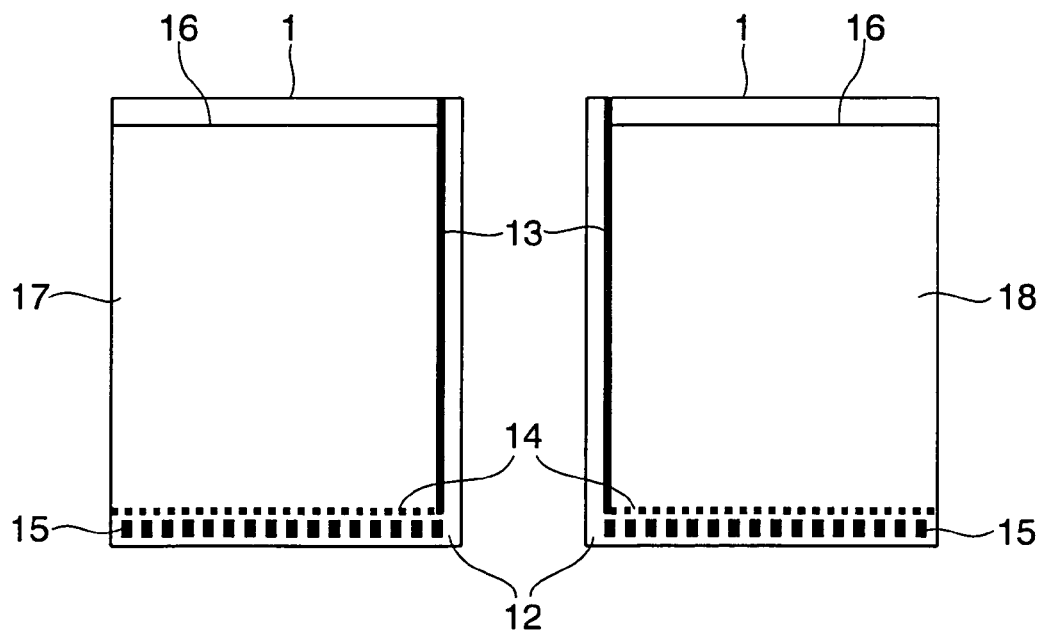
FIG. 16 is a diagram for explaining the carrier sheet.

FIG. 16 is a diagram for explaining a carrier sheet and shows still another example of the carrier sheet 1 of the present invention. In the carrier sheet 1 in this example, each of the two sheets 17 and 18 includes (only) the vertical reference line 13. The horizontal reference line 14 is not provided. Note that, for reference, the horizontal reference line 14 not provided is indicated by a dotted line. The upper reference line 16 may be provided or does not have to be provided. Even if the horizontal reference line 14 is not provided in this way, it is possible to hold the original 2 (21) in an accurate position with the vertical reference line 13 as a reference. When the tilt θ is calculated with the vertical reference line 13 as a reference, since the same applies in the horizontal direction, there is no hindrance in the tilt correction. The combination instruction mark 15 (or the non-combination instruction mark 15') is drawn in the frame area 12 in the same manner as the other examples.

The present invention has been explained according to the embodiments thereof. However, various modifications of the present invention are possible without departing from the spirit of the present invention. For example, the tilt correcting unit 43 does not have to be provided. The tilt correction processing by the tilt correcting unit 43 may be executed after the image combination processing by the image combining unit 44. According to the present invention, since images are combined with the vertical reference line 13 as a reference, the same result as those in the examples described above is obtained even if the tilt correction processing is executed after the image combination processing. The front side image 471 and the rear side image 472 may be combined with the vertical reference line 13 as a reference without slicing images as explained in FIGS. 10 and 11.

INDUSTRIAL APPLICABILITY

As explained above, according to the present invention, in the image processing apparatus and method, it is possible to combine a front side image and a rear side image into one image by detecting a combination instruction mark drawn in a position other than a position of a carrier sheet where an original is held. Thus, it is unnecessary to perform setting operation for distinguishing a reading mode for a usual double-sided original and a mode for folding an original into two and reading and combining original. Since it is unnecessary to perform mode switching in this way, it is possible to mix the usual both-sided original and the original folded into two and continuously reads the originals. Since the carrier sheet is used, the original folded into two is not twisted and an image on the front side and the image on the rear side read are not misaligned. Thus, it is unnecessary to adjust heights (positions in a conveyance direction) of images when the images are combined. This makes it easy to perform image processing.

According to the present invention, in the carrier sheet, a portion for holding an original is matted. Thus, unlike a carrier sheet that is transparent and is not matted, light for reading is not excessively reflected on the surface of the carrier sheet and it is possible to read an image clearly. Since a roller does not slip on the surface of the carrier sheet and conveyance is stabilized, it is possible to read an image clearly.

The invention claimed is:

1. An image processing apparatus, comprising:
an image reading unit configured to receive a medium including a colorless and transparent carrier sheet that includes a combination instruction mark in a predetermined position thereon and holds an original therein and configured to read a front side image and a rear side image from a front side and a rear side of the original, respectively;
a mark detecting unit detecting the combination instruction mark present in the predetermined position; and
an image combining unit combining a front side sliced image and a rear side sliced image sliced from predetermined positions of the front side image and the rear side image in a predetermined direction to obtain one image when the combination instruction mark is detected,
wherein, when the mark detecting unit detects a predetermined non-combination instruction mark of a shape different from the combination instruction mark present in the predetermined position, the mark detecting unit neglects the combination instruction mark and sets each of the front side sliced image and the rear side sliced image sliced from the predetermined positions of the front side image and the rear side image as individual one image.

2. The image processing apparatus according to claim 1, further comprising:
a tilt correcting unit correcting a tilt with a vertical reference line or a horizontal reference line present in the predetermined positions of the front side image and the rear side image as a reference when the combination instruction mark is detected.

3. The image processing apparatus according to claim 1, wherein the image combining unit finds effective ranges in the front side image and the rear side image, selects a larger one of the effective ranges, determines a formal size larger than the selected effective range and closest to a size of the effective range as a size of images, and slices images of the determined size from the front side image and the rear side image to combine the images into one image.

4. The image processing apparatus according to claim 1, wherein the mark detecting unit sets each of the front side image and the rear side image as individual one image when the combination instruction mark is not detected.

5. An image processing method executed in an image processing unit having an image reading unit, a mark detecting unit, and an image combining unit, the image processing method comprising:
at the image reading unit, receiving a medium including a colorless and transparent carrier sheet that includes a combination instruction mark in a predetermined position thereon and holds an original therein and reading a front side image and a rear side image from a front side and a rear side of the original, respectively;
detecting, by the mark detecting unit, a combination instruction mark present in the predetermined position;
combining, by the image combining unit, a front side sliced image and a rear side sliced image sliced from predetermined positions of the front side image and the rear side image to obtain one image when the combination instruction mark is detected;
detecting, by the mark detecting unit, a non-combination instruction mark present on the carrier sheet; and
setting each of the front side sliced image and the rear side sliced image sliced from the predetermined positions of the front side image and the rear side image as individual one image when the non-combination instruction mark is detected.

6. The image processing method according to claim 5, wherein the medium includes a vertical reference line defining a position of a reference in a conveying direction, and
wherein the vertical reference line is used as a reference for slicing of the front side sliced image and the rear side sliced image from the front side image and the rear side image and combining of the front side sliced image and the rear side sliced image.

* * * * *